Patented Sept. 14, 1937

2,093,159

UNITED STATES PATENT OFFICE 2,093,159

CATALYTIC HYDROGENATION OF ESTERS OF ALIPHATIC CARBOXYLIC ACIDS

Otto Schmidt, Ludwigshafen-on-the-Rhine, Germany, assignor to I. G. Farbenindustrie Aktiengesellschaft, Frankfort-on-the-Main, Germany No Drawing. Application March 6, 1930, Serial No. 433,846. In Germany November 20, 1925

11 Claims. (Cl. 260—156)

The present invention relates to the catalytic hydrogenation of esters of carboxylic acids.

I have found that the latent carboxylic group of the organic esters of aliphatic alkyl monocarboxylic acids, especially of those which contain at least 8 carbon atoms in their molecule, can be hydrogenated by passing the said esters at an elevated temperature over hydrogenation catalysts which have been strongly activated. The high activation of the catalysts can be obtained by a very fine disintegration of the catalytic substances which effect may be obtained for example by depositing the catalytic substances on finely divided substrata, such as fibrous asbestos, graphite, silica gel or metal powders and the like, and/or by adding to the catalytic substances activating substances. Suitable catalytic substances are for example copper, nickel, silver, zinc, cadmium, lead or cobalt or mixtures thereof and they may be prepared from their salts, oxides or other compounds prior to or after an incorporation with activating substances. The activating substances may be chosen from compounds of the metals giving acids with oxygen, such as chromium, molybdenum, tungsten, uranium, manganese, vanadium or titanium or mixtures thereof as well as from compounds of the alkali, alkali earth or rare earth metals. As examples of such metals and of other metals may be mentioned potassium, sodium, calcium or magnesium, niobium, tantalum, thorium, cerium, zirconium, rubidium, cesium, osmium, palladium or tantalum or several of these compounds or from boron. The metals giving acids with oxygen may be employed in the form of the alkali metal or alkaline earth metal salts of the said acids or in the form of the salts with the hydrogenating metals as for example copper, nickel, silver or zinc vanadates, molybdates, tungstates and the like and in this case the said hydrogenating metals must not be present as such. The compounds of the rare metals such as oxides or their compounds with the aforesaid acids may be also mixed with the compounds of the acid forming metals. The order of mixing the aforesaid single components is not important and, as already stated, the activating substances may be mixed with compounds of the hydrogenating metals, whereupon the whole mass is subjected to a treatment with hydrogen, whereby the compounds of the hydrogenating metals are converted wholly or at least partially into the free metals. Otherwise the components may be mixed for example in a melt of the activating substances to which the hydrogenating metals or their compounds are added.

The temperatures employed depend generally on the nature of the ester under treatment and its volatility; generally temperatures between about 200° and 400° C. are employed. The quantity of hydrogen is advantageously chosen considerably above that theoretically required for the hydrogenation and in the place of pure hydrogen gaseous mixtures containing the same may be employed. In this manner esters of monobasic carboxylic acids can be catalytically hydrogenated with the formation of aldehydes, alcohols and even of hydrocarbons depending on the conditions of working, the acid component of the esters being apparently converted at first into an aldehyde and subsequently into an alcohol and finally into a hydrocarbon. Thus, for example by applying a rather high temperature and a rather low quantity of hydrogen aldehydes may be produced, whereas the application of low temperatures and of higher quantities of hydrogen leads to the production of alcohols; by choosing very strong conditions of working hydrocarbons are obtained. In this manner even esters of vegetal carboxylic acids, having a very high molecular weight, such as oleic methyl ester, oleic acid or train oil acid or linoleic acid ethyl esters can be converted into alcohols of the aliphatic series having a high molecular weight which hitherto have not been available commercially. These alcohols may find useful application in the production, for example of artificial waxes or cosmetic preparations or of washing, emulsifying or wetting agents by sulphonation, for which purposes they may be employed even in acid baths or together with hard water.

By the addition as carriers of metal oxides having a basic reaction, such as magnesia, of agents assisting in splitting off water, such as alumina, catalytic substances can be obtained which generally allow of obtaining a very far-going, particularly energetic hydrogenation already at low temperatures, whereas the addition of acid agents, such as precipitated silicic acid allows of stopping the hydrogenation at any desired intermediate stage. Also the nature of the metal contained in the catalytic substances allows of influencing the reaction in a considerable degree. Thus, for example, nickel provides in many cases a much more energetic hydrogenation than copper and the catalytic substances which have been strongly activated are in many cases much more efficient than catalytic substances consisting of finely divided metals solely.

The following examples will further illustrate

Example 1

1 liter each of glass beads of about 7 millimeters diameter is moistened with a saturated aqueous solution of 3.3 grams of ammonium vanadate, whereupon 130 grams each of finely powdered copper carbonate are added to the mixture, while stirring. After drying the mixture it is treated with hydrogen at from 270° to 280° C. A mixture of 99 parts by volume of hydrogen and of 1 part by volume of acetic ethyl ester is then passed over the aforesaid catalytic mass at a temperature of from 270° to 280° C. at such a velocity that the reaction vessel is filled about 160 times per hour with fresh initial material, whereby about 50 per cent of the acetic acid contained in the acetic ester is converted into ethyl alcohol. By repeatedly leading the reaction mixture over the catalytic mass the yield of alcohol can be further increased. The gaseous mixture leaving the reaction vessel is cooled, the mixture of alcohol and acetic ester being then separated in any usual and convenient manner. The yield of ethyl alcohol may be increased to about 80 per cent of that theoretically obtainable.

Example 2

1 liter each of glass beads of about 7 millimeters diameter is stirred with 300 cubic centimeters each of a 4 per cent aqueous colloidal solution of silicic acid and with 130 grams each of finely powdered copper chromate. The mass is then dried and treated with hydrogen at a temperature of from 270° to 280° C. A mixture of 100 parts by volume of hydrogen and 0.2 part by volume of the ethyl esters of train oil acid obtainable by heating train oil with ethyl alcohol to a temperature above 100° C., is then passed at from 280° to 290° C. over the aforesaid catalytic mass and the gaseous mixture leaving the reaction vessel is cooled, whereby solid crystalline products are obtained which may be purified by dissolution in ethyl alcohol or acetone and recrystallization. A good yield of octodecyl alcohol having a melting point of 56° to 60° C. is obtained.

Example 3

1 liter each of glass beads of about 7 millimeters diameter is stirred with 270 cubic centimeters each of a 4 per cent aqueous colloidal solution of silicic acid and with 133 grams of fresh copper chromate, whereupon the mass is dried and then treated with hydrogen at from 250° to 260° C. A mixture of 100 parts by volume of dry hydrogen and 1 part by volume of vaporized glycollic ethyl ester is passed over the catalytic mass in such a manner that the reaction space is fed about 70 times per hour with fresh initial material. The gaseous mixture leaving the reaction vessel is cooled as far as possible, whereby ethyl alcohol and ethylene glycol are obtained together with small quantities of water and unaltered initial glycollic ester, the mixture being then separated in any usual and convenient manner, for example by fractional distillation.

Example 4

1 liter each of glass beads of about 7 millimeters diameter is stirred with 270 cubic centimeters each of a 4 per cent aqueous colloidal solution of silicic acid, 133 grams each of finely powdered nickel carbonate and 3.3 grams each of ammonium chromate. The mass is then dried and treated with hydrogen at from 300° to 320° C. A mixture of 100 parts by volume of hydrogen and 0.75 part by volume of vaporized linoleic methyl ester is then passed over the aforesaid catalytic mass at from 190° to 200° C., the gaseous mixture leaving the reaction vessel being cooled. A water-clear liquid is obtained which consists almost exclusively of hydrocarbons (hexadecane and its homologues), the main portion of which boils between 286° and 310° C., higher alcohols being not contained in the product.

The process according to this and to the foregoing examples may be also carried out with the esters in the liquid state and/or at superatmospheric pressure.

What I claim is:—

1. The process for the catalytic hydrogenation of esters of aliphatic alkylmonocarboxylic acids, which comprises passing the said esters together with hydrogen while heating to a temperature of the range from 200 to 400° C. over a cobalt catalyst containing an activating substance consisting of an oxide of the metals forming acids with oxygen until substantial quantities of alcohols corresponding to the said alkylmonocarboxylic acid radicles are formed.

2. The process for the catalytic hydrogenation of esters of aliphatic alkylmonocarboxylic acids, which comprises passing the said esters together with hydrogen while heating to a temperature of the range from 200 to 400° C. over a hydrogenating catalyst essentially comprising cobalt until substantial quantities of alcohols corresponding to the said alkylmonocarboxylic acid radicles are formed.

3. The process for the catalytic hydrogenation of esters of aliphatic alkylmonocarboxylic acids, which comprises passing the said esters together with hydrogen while heating to a temperature of the range from 200 to 400° C. over an activated hydrogenating catalyst essentially comprising cobalt until substantial quantities of alcohols corresponding to the said alkylmonocarboxylic acid radicles are formed.

4. The process for the catalytic hydrogenation of esters of aliphatic alkylmonocarboxylic acids, which comprises passing the said esters together with hydrogen while heating to a temperature of the range from 200 to 400° C. over a hydrogenating catalyst essentially comprising cobalt in combination with an activating substance, selected from the class consisting of oxides of metals giving acids with oxygen and compounds of alkali, alkaline earth and rare earth metals with metal acids until substantial quantities of alcohols corresponding to the said alkylmonocarboxylic acid radicles are formed.

5. The process for the catalytic hydrogenation of esters of aliphatic alkylmonocarboxylic acids, which comprises passing the said esters together with hydrogen while heating to a temperature of the range from 200 to 400° C. over a hydrogenating catalyst essentially comprising cobalt activated by the addition of a basic reacting metal oxide as a carrier until substantial quantities of alcohols corresponding to the said alkylmonocarboxylic acid radicles are formed.

6. The process for the catalytic hydrogenation of esters of aliphatic alkylmonocarboxylic acids, which comprises passing the said esters together with hydrogen while heating to a temperature of the range from 200 to 400° C. over a hydrogenating catalyst consisting of the cobalt salt of a metal acid until substantial quantities of alcohols corresponding to the said alkylmonocarboxylic acid radicles are formed.

7. The process for the catalytic hydrogenation of esters of aliphatic alkylmonocarboxylic acids, which comprises passing the said esters together with hydrogen while heating to a temperature of the range from 200 to 400° C. over a hydrogenating catalyst essentially comprising cobalt activated by the addition of a compound selected from the group consisting of salts of metal acids and basic metal oxides deposited on a carrier until substantial quantities of alcohols corresponding to the said alkylmonocarboxylic acid radicles are formed.

8. The process for the catalytic hydrogenation of esters of aliphatic alkylmonocarboxylic acids, which comprises passing monoalkyl esters of high molecular fatty acids of vegetal origin together with hydrogen while heating to a temperature of the range from 200 to 400° C. over a hydrogenating catalyst essentially comprising cobalt until substantial quantities of alcohols corresponding to the said alkylmonocarboxylic acid radicles are formed.

9. The process for the catalytic hydrogenation of an organic ester of an aliphatic alkyl carboxylic acid containing at least 8 carbon atoms in its molecule which comprises heating said ester together with hydrogen at a temperature of about 250° C. at superatmospheric pressure in the presence of a hydrogenating catalyst essentially comprising cobalt as hydrogenating constituent.

10. The process for the catalytic hydrogenation of an organic ester of an aliphatic alkyl carboxylic acid containing at least 8 carbon atoms in its molecule which comprises heating said ester together with hydrogen at a temperature of about 250° C. at superatmospheric pressure in the presence of an activated hydrogenating catalyst essentially comprising cobalt until substantial quantities of alcohols corresponding to the said alkylmonocarboxylic acid radicles are formed.

11. The process for the catalytic hydrogenation of esters of aliphatic alkylmonocarboxylic acids, which comprises passing vapors of the said esters together with hydrogen while heating to a temperature of the range from 200 to 400° C. over an activated hydrogenating catalyst essentially comprising cobalt until substantial quantities of alcohols corresponding to the said alkylmonocarboxylic acid radicles are formed.

OTTO SCHMIDT.